Nov. 9, 1926.  A. MOHIN  1,606,093
ELASTIC SUSPENSION FOR THE REAR FORK OF A BICYCLE
Filed Oct. 14, 1924    2 Sheets-Sheet 1
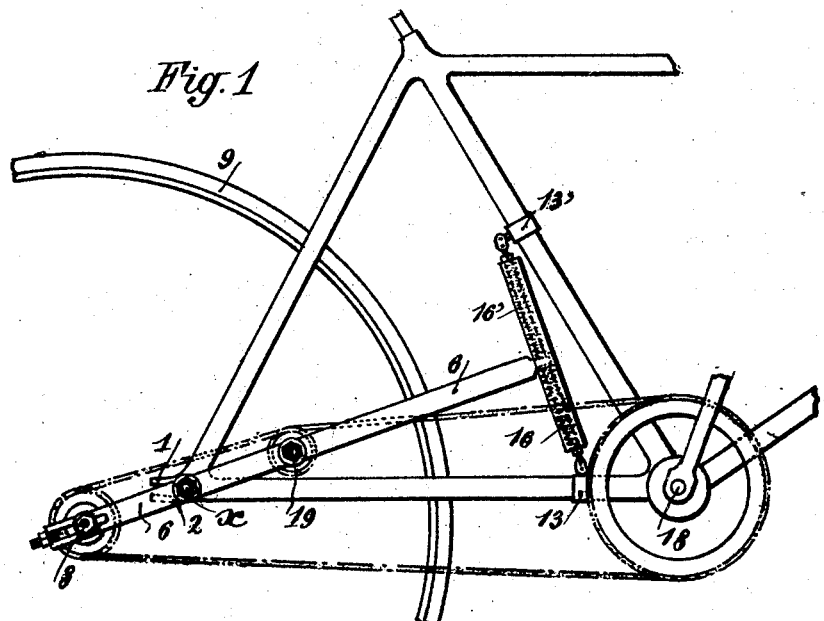
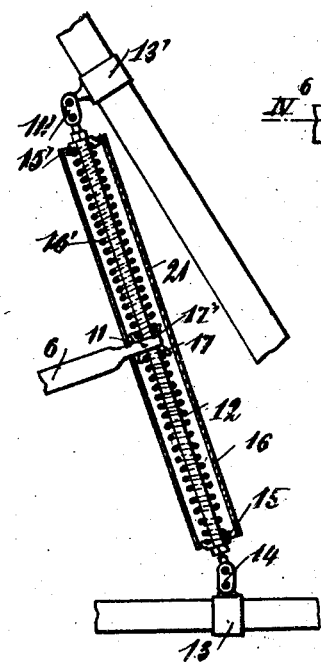
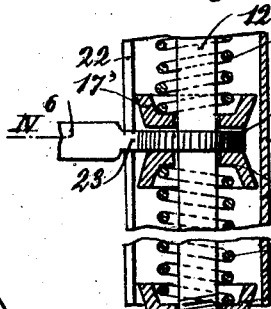
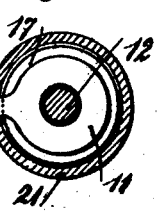
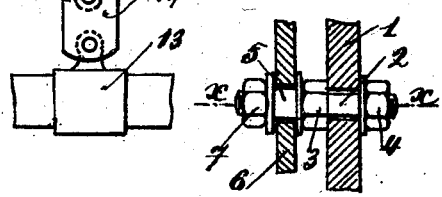

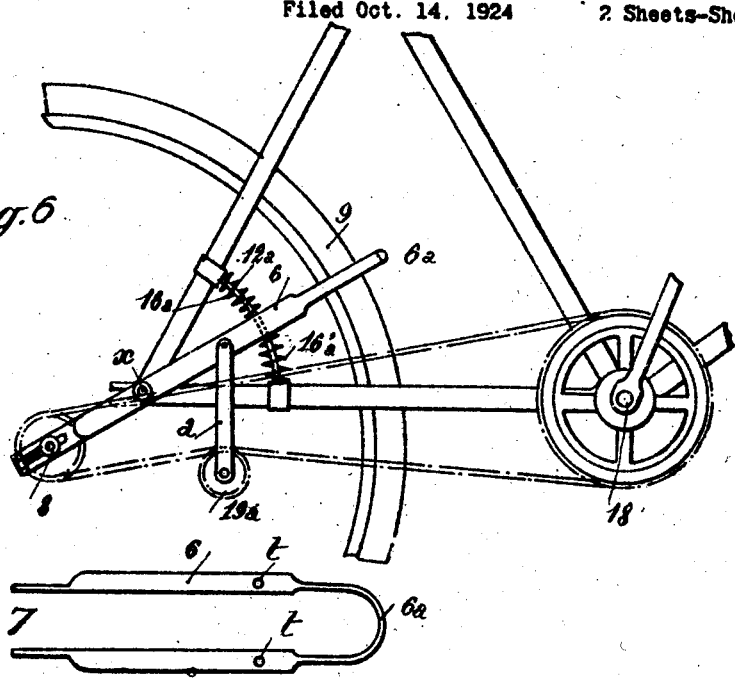

Patented Nov. 9, 1926.

1,606,093

UNITED STATES PATENT OFFICE.

ABEL MOHIN, OF VALENCIENNES, FRANCE.

ELASTIC SUSPENSION FOR THE REAR FORK OF A BICYCLE.

Application filed October 14, 1924, Serial No. 743,565, and in France October 18, 1923.

The present invention has for its object an elastic suspension for the rear fork of a bicycle or like wheeled device, which has the advantage of being applicable to the known types of bicycles, and provides for a maintenance of the rear wheel in its plane in a reliable and well-guided manner, as well as for a flexible suspension, while at the same time ensuring the uniform stretching of the chain.

My improved suspension device comprises an auxiliary swinging fork mounted on a pivot provided in the cycle frame in the position usually occupied by the rear axle, and co-operating with a shock absorbing spring, and, according to the main feature of my invention, it further comprises a pinion which is rotatably mounted on an axle carried by the auxiliary fork, this pinion engaging with a portion of the driving chain of the cycle and serving to compensate for the slackening of the chain which otherwise would be produced by the movement of the fork in one direction. The auxiliary fork is maintained between two compression springs in such manner that the device will act as a shock absorber when the wheel is either lifted or lowered in regard of the frame. The said auxiliary fork is preferably combined with a chain tensioning device mounted upon one of its arms opposite the axle of the wheel in regard of the pivoting axis; said tensioning device is mounted in such manner as to compensate for the slackening of the chain which would otherwise be produced by the one-sided pivoting movement of said fork.

The appended drawing shows by way of example an embodiment of the said invention. Fig. 1 is a side elevation of the device as applicable to a bicycle. Fig. 2 is a partial section on a larger scale, on the axis of the guiding rod of the auxiliary fork, with the corresponding springs and attaching members. Fig. 3 is a sectional view of a detail on a larger scale showing the method of guiding of the fork. Fig. 4 is a section on the line IV—IV of Fig. 3.

Fig. 5 is a section on the pivoting axis showing the said stationary fork in co-operation with the oscillation pivots of the auxiliary fork. Figs. 6, 7, 8 and 9 are modifications described hereafter of the said device.

In Figs. 1 to 5, each of the limbs 1 of the rear stationary fork of the bicycle is provided with a bolt 2 having for instance an hexagonal head 3, and a nut 4; said bolt comprises, outwardly of the fork 1, a bearing portion serving as a pivot for the auxiliary fork 6 embracing a wheel 9; a nut 7 screwed to the outer end of the bolt 2 and co-operating with a shoulder 5 serves to maintain the auxiliary fork 6 in position. The latter is thus mounted in such manner as to pivot loosely on the common axis $x$—$x$ of the two bolts 2, in the usual place of the axis of the wheel. The auxiliary fork 6 is provided at the rear between the ends of its two branches, and by assembling means known per se, with an axle 8 for the wheel 9 which is actuated by the chain whose length is increased for this purpose; the forward end uniting the two branches terminates in a flat portion or lug 11 pierced with an aperture into which is inserted the guiding rod 12; which is secured, for example, by means of two collars 13 and 13' to the bicycle frame. The guiding rod 12 may be curved and concentric with the pivoting axis $x$, or otherwise the lug 11 of the swinging fork may have an elongated slot providing for the movement therein of the rod 12 in the guiding plane; the present device comprises a rectilinear guiding rod which is pivoted to the frame by means of two links 14, 14', whereby the rod 12 may follow the motion of the lug 11 on the axis of oscillation $x$. The rod 12 has loosely mounted at either end thereof a cup 15, and 15' respectively, co-operating with one of the extremities of each of the springs 16 and 16', the other ends of which co-operate with similar cups 17 and 17' provided on the lug 11, and apertured for the loose insertion of the guiding rod 12.

It is observed that the two antagonistic springs 16, 16' will maintain the lug 11 of the fork 6 in position and will tend to prevent both, the ascending and descending motion of the axle 8 of the wheel relative to the frame.

If for instance the axle of the wheel 8 descends with reference to the frame at the same time the forward end of the fork ascends, expanding the spring 16 and compressing the spring 16'. It is observed that the chain 10 will be slackened when the axle 8 of the wheel approaches the axis 10 of the crank bracket. To compensate for this effect, I may provide, according to the invention, a chain wheel 19 mounted at a suitable point 20 of the auxiliary fork and engaging a strand of the chain, so that in the above-described movement, the ascent of the forward part of the auxiliary fork will cause the stretching wheel 19 to act upon the chain, thus compensating by the tension given to the upper strand for the slackening of the lower strand occasioned by the motion of the axle 8.

The outer cups 15, 15' of the said springs are preferably adjustable along the rod 12, for example by screwing, Fig. 3, so as to provide for the regulation of the initial tension of each of the springs 16, 16' whereby the said device will be adapted to the weight of the rider and to the mean position of the auxiliary fork 6. Obviously, the attaching means for the guiding rod as well as the form of the latter may be varied within wide limits.

It should be noted that as regards the two arms of the lever of the auxiliary fork disposed upon either side of the axis of oscillation $x$, one arm is made longer than the other, and hence the motion of the lug 11 is much greater than the motion of the axle 8, so that the springs 16, 16' may have a great elasticity and a long stroke, whereby a very flexible suspension will be provided. On the other hand, the fact that the axle 8 of the wheel is brought near the pivoting axle $x$ of the swinging fork, in addition to the large ratio of increase of motion above mentioned, will sufficiently ensure the maintenance of the wheel in its plane, due to the guiding effect of the lug 11.

The whole device consisting of the guiding rod with its springs and co-operating cups may be enclosed in a split tube 21 which conceals the whole arrangement, said tube following all the movements of the jointed rod 12 and allowing the free sliding in its slot of the neck 23 disposed between the fork 6 and the guiding lug 11.

Figs. 6 and 7 relate to a modification, Fig. 6 being a side elevation of the whole device analogous to Fig. 1, and Fig. 8 a plan view of the auxiliary fork; said device is substantially the same as the one shown in Fig. 1, save for the following dispositions. The auxiliary fork 6 is extended forwardly to exactly the proper degree in order to pass around the wheel tyre 9 by means of its curved portion 6ª; each of its branches is pierced with an aperture $t$ into which is inserted the circular guiding rod 12ª which is concentric with the pivoting axis $x$ of the auxiliary fork; two pairs of shock-absorbing springs 16ª, 16ª' are disposed about the rods 12ª in order to press the corresponding branches of the fork; I may further provide thrust members comprising cups, analogous to what is shown in Fig. 3; the outer cups are optionally adjustable as in Fig. 3 and may co-operate with the ends of the springs. On the other hand, the stretching wheel 19ª, instead of being pivoted directly to the fork 6 and engaging the upper strand of the chain, is herein supported by an auxiliary fork 6''' by means of an arm $a$ pivoted thereto, and is engaged with the lower strand of the chain; the operation is however the same as above set forth, and no further description will be necessary.

Figs. 8 and 9 show another modification. Fig. 8 is a side view analogous to Fig. 1, and Fig. 9 is a front view of the guiding rod for the shock-absorbing spring; the arrangement is the same as shown in Figs. 6 and 7 as concerns the shape of the auxiliary fork and its stretching wheel, but in this latter arrangement only a single spring is provided which acts not upon the forward part of the auxiliary fork at a point opposite the pinion of the wheel 9 with respect to the pivoting axis $x$, but directly upon the axis 8 of the wheel by means of a forked rod B having the form represented in Fig. 9, the single shock-absorbing spring 16ᵇ being interposed between the forked elbow $b$ of the rod B forming a stop portion and a stationary stop-piece 15ᵇ which is mounted in a permanent or adjustable manner upon the rear upright C of the bicycle frame.

Obviously, the arrangements and the several details of the said invention, are susceptible of modifications within wide limits without departing from the principle of the invention. The swinging fork may be given any suitable form, for example a straight, curved, angular or like form.

Claims—

1. An elastic suspension for the chain-operated rear wheel, of a bicycle, comprising an auxiliary fork pivoted to the rear fork of the bicycle in the usual position of the wheel axle, said auxiliary fork supporting the wheel axle between its outer branches, a shock-absorbing spring acting upon the said auxiliary fork in order to maintain the same in position in an elastic manner, and a revoluble stretching wheel mounted upon the said auxiliary fork and co-operating with a strand of the chain at a suitable point thereupon, thus affording compensation for the changes in distance, between the axes of the sprocket wheels co-operating with the ends of the chain which changes are due to the oscillations of the said auxiliary fork.

2. An elastic suspension for the rear wheel of a bicycle, comprising an auxiliary fork which is pivoted to the rear fork of a bicycle in the usual situation of the wheel axle and at an intermediate point upon the length of the said fork, the said pivoting auxiliary fork carrying the axis of the said wheel between the ends of its rear branches, guiding means secured to the bicycle frame and adapted to guide the auxiliary fork in its oscillation, and antagonistic shock-absorbing springs guided by said guiding means and acting upon the said auxiliary fork in both directions of the oscillation whereby the said fork shall be brought into the initial position.

3. An elastic suspension for the rear wheel of a bicycle, comprising an auxiliary fork which is pivoted to the rear fork of a bicycle in the usual situation of the wheel axle and at an intermediate point upon the length of the said fork, the said pivoting auxiliary fork carrying the axis of the said wheel between the ends of its rear branches, guiding means secured to the bicycle frame and adapted to guide the auxiliary fork in its oscillation, and antagonistic shock-absorbing springs guided by said guiding means and acting upon the said auxiliary fork in both directions of the oscillation whereby the said fork shall be brought into the initial position, and means for regulating the position of the outer end of each of the said shock-absorbing springs upon the said guiding rod, for the adjustment of the suspension according to the rider's weight and to the requisite mean position of the auxiliary fork.

4. An elastic suspension for the rear wheel of a bicycle, comprising an auxiliary fork which is pivoted to the rear fork of a bicycle in the usual situation of the wheel axle and at an intermediate point upon the length of the said fork, the said pivoting auxiliary fork carrying the axis of the said wheel between the ends of its rear branches, guiding means secured to the bicycle frame and adapted to guide the auxiliary fork in its oscillation, and antagonistic shock-absorbing springs guided by said guiding means and acting upon the said auxiliary fork in both directions of the oscillation whereby the said fork shall be brought into the initial position, and a revoluble stretching wheel mounted upon said auxiliary fork and co-operating with a strand of the chain at a suitable point thereupon, thereby affording compensation for the variations in distance between the axes of the sprocket wheels co-operating with the ends of the chain, which variations are determined by the oscillations of said auxiliary fork.

5. An elastic suspension for a chain-operated rear wheel of a bicycle, comprising an auxiliary fork pivoted at an intermediate point upon the rear fork of the bicycle in the usual situation of the axis of the wheel, the said auxiliary fork carrying the axis of the said wheel between the ends of its rear branches, a guiding rod pivoted to the bicycle frame and traversing an aperture in the forward end of the said auxiliary fork and guiding the said fork in its oscillations, spiral shock-absorbing springs surrounding the said guiding rod and whereof the inner ends co-operate with the end of the auxiliary fork, the outer ends of said springs abutting against stop-pieces which are adjustable along the said guiding rods, a split tube surrounding the said guiding rod and springs and affording a free lengthwise movement for the end of the auxiliary fork, and a revoluble stretching wheel mounted upon the lateral branch of the auxiliary fork and engaging a given strand of the chain whereby the latter will be maintained in the proper tension irrespectively of the oscillations of the auxiliary fork.

In witness whereof I have hereunto set my hand.

ABEL MOHIN.